US008728636B2

(12) United States Patent
Kleinhempel et al.

(10) Patent No.: US 8,728,636 B2
(45) **Date of Patent: *May 20, 2014**

(54) INSULATING GLASS UNIT WITH CRACK-RESISTANT LOW-EMISSIVITY SUSPENDED FILM

(71) Applicant: Southwall Technologies Inc., Palo Alto, CA (US)

(72) Inventors: Ronny Kleinhempel, Gelenau (DE); Julius G. Kozak, Antioch, CA (US); Roland C. Thielsch, Dresden (DE); Richard T. Wipfler, Menlo Park, CA (US); Christian H. Stoessel, Santa Rosa, CA (US); Lee C. Boman, Belmont, CA (US)

(73) Assignee: Southwall Technologies Inc., Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/903,360

(22) Filed: May 28, 2013

(65) Prior Publication Data

US 2013/0260062 A1 Oct. 3, 2013

Related U.S. Application Data

(63) Continuation-in-part of application No. 12/966,469, filed on Dec. 13, 2010, now Pat. No. 8,530,011.

(51) Int. Cl.

| | |
|---|---|
| *B32B 17/04* | (2006.01) |
| *B32B 15/08* | (2006.01) |
| *B32B 15/09* | (2006.01) |
| *E06B 3/00* | (2006.01) |

(52) U.S. Cl.
USPC ............. 428/701; 428/34; 428/458; 428/469; 428/480; 428/688; 428/689; 428/699; 428/702

(58) Field of Classification Search
USPC ......... 428/432, 434, 458, 480, 688, 689, 701, 428/702, 34, 469, 699
See application file for complete search history.

(56) References Cited

U.S. PATENT DOCUMENTS 4,204,942 A 5/1980 Chahroudi
4,335,166 A * 6/1982 Lizardo et al. .................. 428/34

(Continued)

FOREIGN PATENT DOCUMENTS

WO WO 2008/083308 A1 7/2008
WO WO 2009/085741 A2 7/2009

OTHER PUBLICATIONS

ASTM D522; Standard Test Methods for Mandrel Bend Test of Attached Organic Coatings.

(Continued)

*Primary Examiner* — David Sample
*Assistant Examiner* — Lauren Colgan
(74) *Attorney, Agent, or Firm* — Eric D. Middlemas

(57) ABSTRACT

A low-e insulating glass unit has a suspended, coated IR reflecting polymer sheet under tension, e.g. from heat shrinkage. The polymer sheet is coated with a multilayer stack of dielectric and metallic layers, including at least one silver layer deposited upon a zinc oxide seed layer that is at most 15 nm thickness. The use of zinc oxide ensures good seeding for high quality silver layer growth, thereby providing low emissivity. The thinness of the zinc oxide ensures that it resists cracking when the polymer sheet is tensioned.

15 Claims, 4 Drawing Sheets

(56) References Cited

U.S. PATENT DOCUMENTS

| | | | | |
|---|---|---|---|---|
| 4,386,130 | A | 5/1983 | Hayashi et al. | |
| 4,419,386 | A | 12/1983 | Gordon | |
| 4,520,611 | A * | 6/1985 | Shingu et al. | 52/786.11 |
| 4,536,424 | A | 8/1985 | Laurent | |
| 4,536,998 | A * | 8/1985 | Matteucci et al. | 52/171.3 |
| 4,799,745 | A | 1/1989 | Meyer et al. | |
| 4,849,087 | A | 7/1989 | Meyer | |
| 5,061,568 | A * | 10/1991 | Kessel et al. | 428/437 |
| 5,225,273 | A | 7/1993 | Mikoshiba et al. | |
| 5,306,547 | A * | 4/1994 | Hood et al. | 428/213 |
| 5,325,579 | A | 7/1994 | Baier | |
| 5,532,062 | A | 7/1996 | Miyazaki et al. | |
| 5,983,593 | A | 11/1999 | Carbary et al. | |
| 6,261,694 | B1 * | 7/2001 | Iacovangelo | 428/412 |
| RE37,446 | E | 11/2001 | Miyazaki et al. | |
| 6,333,084 | B1 | 12/2001 | Woodard et al. | |
| 6,503,636 | B1 | 1/2003 | Le Masson et al. | |
| 6,582,809 | B2 | 6/2003 | Boire et al. | |
| 6,805,960 | B1 | 10/2004 | Demiryont | |
| 6,919,134 | B2 | 7/2005 | Mitsuishi et al. | |
| 6,974,629 | B1 | 12/2005 | Krisko et al. | |
| 7,122,252 | B2 | 10/2006 | Hoffman | |
| 7,150,916 | B2 | 12/2006 | Lemmer et al. | |
| 7,153,577 | B2 | 12/2006 | Wang et al. | |
| 7,186,465 | B2 * | 3/2007 | Bright | 428/482 |
| 7,521,096 | B2 | 4/2009 | Lemmer et al. | |
| 7,641,978 | B2 | 1/2010 | Veerasamy | |
| 7,758,915 | B2 | 7/2010 | Hoffman | |
| 7,771,830 | B2 | 8/2010 | Neuman et al. | |
| 8,241,752 | B2 * | 8/2012 | Bright | 428/469 |
| 8,530,011 | B2 * | 9/2013 | Kleinhempel et al. | 428/34 |
| 2003/0228476 | A1 * | 12/2003 | Buhay et al. | 428/469 |
| 2009/0068384 | A1 | 3/2009 | Seth et al. | |
| 2010/0316852 | A1 * | 12/2010 | Condo et al. | 428/201 |

OTHER PUBLICATIONS

Copending U.S. Appl. No. 12/966,469, filed Dec. 13, 2010, Ronny Kleinhempel et al.

USPTO Office Action dated Feb. 28, 2013 for U.S. Appl. No. 12/966,469.

* cited by examiner

INSULATING GLASS UNIT WITH CRACK-RESISTANT LOW-EMISSIVITY SUSPENDED FILM

CROSS REFERENCE TO RELATED APPLICATIONS

This application is a continuation-in-part of U.S. patent application Ser. No. 12/966,469, filed Dec. 13, 2010 now U.S. Pat. No. 8,530,011, which is incorporated herein by reference in its entirety.

TECHNICAL FIELD

The present invention relates to insulating glass units (IGUs) having a low emissivity (low-E) coating stack for films that are suspended and tensioned in the IGUs, with particular emphasis upon both the quality of the infrared reflecting layer formed in the coating stack and the resistance of the low-E coating stack to cracking or crazing.

BACKGROUND ART

U.S. Pat. No. 4,335,166 to Lizardo et al. describes an insulating glass unit (IGU) comprising a frame with spacers that support a heat-shrinkable plastic sheet between a pair of spaced apart, but substantially parallel, glass panes to provide an integral unit. Heating the assembled unit causes the plastic sheet to shrink so as to become taut and wrinkle-free. The plastic sheet may be a polyethylene terephthalate (PET) film that can be coated on one or both sides with an infrared reflective material.

U.S. Pat. No. 4,799,745 to Meyer et al. describes visually transparent, infrared (IR) reflecting composite films useful in IGUs like that described in the aforementioned Lizardo patent. A transparent support can be selected from among rigid and non-rigid but minimally stretchable solids, including glass and various polymers (including PET). A layer stack of 3 or 7 alternating dielectric and metal layers is sputter-deposited onto one surface of the support. The dielectric layers can be composed of an inorganic metal or semi-metal oxide or salt having a refractive index between 1.75 and 2.25, such as indium oxide, tin oxide, titanium dioxide, silicon dioxide, bismuth oxide, chromium oxide, zinc sulfide, magnesium fluoride, or mixtures thereof. Polymer dielectrics are also disclosed. The metal layers can be composed of silver, gold, platinum, palladium, aluminum, copper, nickel, or alloys thereof (e.g., silver alloyed with up to 25% gold). Spacer dielectric layers between the two or three metal layers have thicknesses between 40-200 nm, preferably 50-110 nm, and especially 70-100 nm. Boundary dielectric layers on the outside of the stack have thicknesses between 20-150 nm, preferably 25-90 nm, and especially 30-70 nm. (These thicknesses are for the inorganic dielectric materials. Polymer dielectric layers with their lower refractive index are disclosed to be somewhat thicker.) The metal layers have a combined total thickness between 12-80 nm, with each metal layer having a thickness between 4-40 nm, preferably 4-17 nm, especially 5-13 nm, with 10-12 nm each indicated for two-metal-layer stacks and 5-10 nm each for three-metal-layer stacks.

A variety of window assemblies have a film coating laminated to or deposited directly onto one or more glass substrates, rather than suspend a sheet in a space between pairs of glass panes.

U.S. Pat. No. 6,503,636 to Le Masson et al. describes a transparent polymer (e.g. polyester) substrate that is provided with a stack of layers including at least one silver layer reflecting thermal radiation. The stack is constructed to prevent stresses from causing it to delaminate or curl up. In particular, the presence of an AlN layer under tensile stress compensates for the compressive stresses in a less than 15 nm thick ZnO layer contiguous with the silver layer, so that the film will lie flat when laminated.

U.S. Reissued Pat. RE 37,446 and U.S. Pat. No. 5,532,062, both to Miyazaki et al., describe low emissivity films comprising a glass substrate coated with a stack of alternating oxide and metallic films. The oxide film furthest from the substrate has an internal stress not more than $1.1\times10^{10}$ dyne/$cm^2$ in order to prevent exfoliation of that surface film from the underlying metal layer due to moisture damage, with consequent turbidity or haze. In order to achieve this internal stress reduction, the 20-70 nm thick, outermost ZnO film is doped with at least one of Si, B, Ti, Mg, Cr, Sn or Ga in a total of up to 10 atomic %, and preferably 2 to 6 atomic %, with respect to the total quantity including Zn. The other oxide layers closer to the substrate may be selected from ZnO, $SnO_2$, ZnO—$SnO_2$ multi-layers, or a doped ZnO like the outermost oxide layer. At least one of the metal film layers may be an IR reflecting layer composed of Ag, or an alloy whose major component is Ag including at least one of Au, Cu and Pd.

Zinc oxide is a well-known seed layer for the growth of silver. The thicker the ZnO seed layer, the better the epitaxial growth of silver on the seed. This results in higher quality silver and consequently a lower emissivity for a given area-specific amount of silver. However, in contexts where a film layer is suspended in tension between windowpanes rather than directly coated onto a windowpane, the brittleness of the highly crystalline zinc oxide becomes a problem. Shrinking or tensioning of the film tends to cause zinc oxide layers to experience crazing, forming a network of myriad visible cracks. Too much shrinking (≥≈1.0%) results in cracked film. However, too little shrinking (≤≈0.5%) results in sagging or wrinkled film that is also visible as image distortions reflected from the film within the window. The distortion from low film tension is exaggerated when the IGU is exposed to elevated ambient temperatures since the thermal expansion coefficient of the film is higher than that of the glass panes.

Traditionally this has not been a problem because $In_2O_3$ has been used as the seed layer material, since $In_2O_3$ has a more amorphous or glassy structure in comparison and is therefore less subject to crazing. However, $In_2O_3$ is not as good a seed for the deposition of high quality (lower emissivity) silver.

SUMMARY OF THE INVENTION

An IGU is provided wherein the suspended and tensioned coated film has a ZnO seed layer that is at most 15 nm thick. The thinner ZnO is better able to withstand the strain of a tensioned film without crazing, while still able to serve as an adequate seed for high quality silver deposition.

DETAILED DESCRIPTION

Figure 1A:
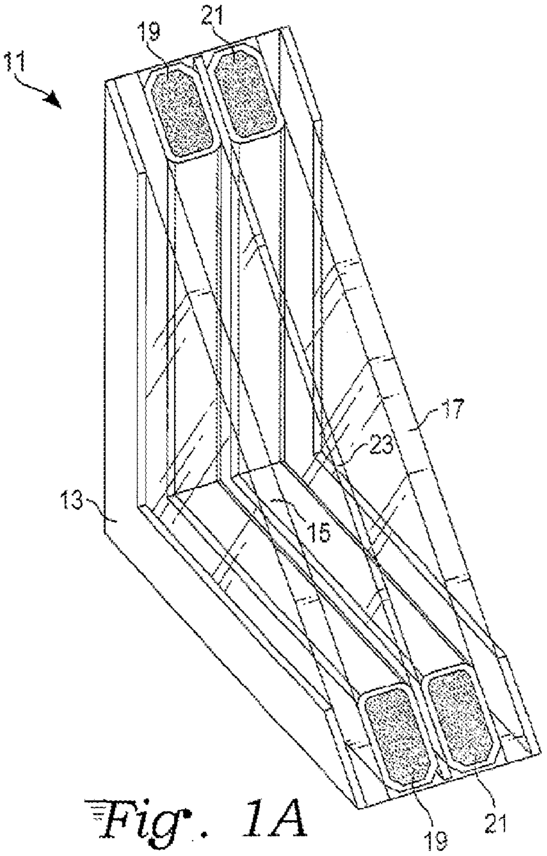
FIGS. 1A and 1B are perspective views of corner portions of two insulating glass unit (IGU) embodiments in accord with the present invention installed within a frame. The IGU in FIG. 1A has a single suspended film, while the IGU in FIG. 1*b* is provided with two suspended films.

With reference to FIG. 1A, an IGU 11 is shown, here as installed within an optional frame 13. The IGU 11 itself includes a pair of glass panes 15 and 17, a pair of spacers 19 and 21, and a coated sheet 23 suspended between the panes 15 and 17. The spacers 19 and 21 support the panes 15 and 17 and sheet 23 in a spaced apart and substantially parallel relation. The coated sheet 23 is transparent to visible light, but reflective of infrared (or thermal) light due to the low emissivity coating. Additionally, the sheet 23 embodies certain improvements in crack resistance while maintaining a desired low emissive property.

Figure 1B:
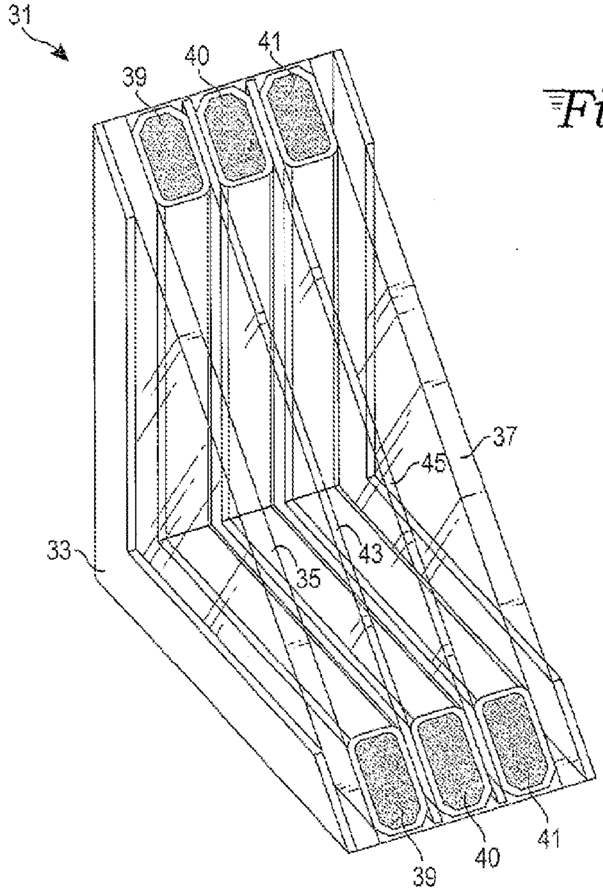

An alternative embodiment is seen in FIG. 1B, wherein an IGU 31 includes a pair of glass panes 35 and 37, three spacers 39-41, and a pair of coated sheets 43 and 45 suspended between the panes 35 and 37. As in the first embodiment, the spacers 39-41 support the panes 35 and 37 and the pair of sheets 43 and 45 in mutually spaced apart and substantially parallel relation to one another. Both sheets are transparent and resistant to cracking under tension. At least one, and preferably both, of the sheets 43 and 45 exhibit the infrared reflectivity, low emissivity properties of sheet 23.

Again, the IGU 31 is shown installed in an optional frame 33. Frames 13 or 33, not part of the invention itself, may be provided by secondary window manufacturers who purchase IGUs 11 or 31 from a primary manufacturer of the IGUs themselves, e.g. to supply decorative features to the windows they sell directly to consumers.

Figure 2:
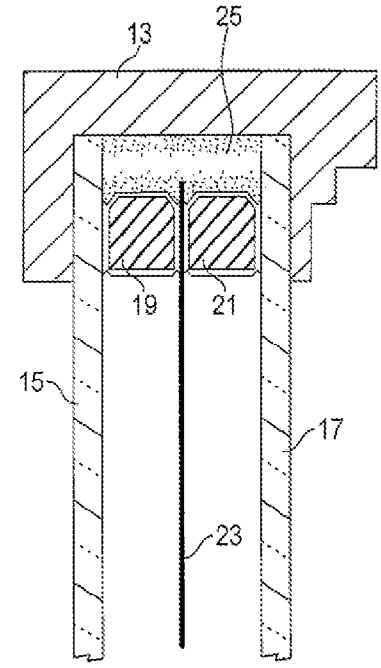
FIG. 2 is a side sectional view of the IGU in FIG. 1A.

With reference to FIG. 2, a sectional view of FIG. 1A, shows that the spacers 19 and 21 are located only at the perimeter or edges of the respective panes 15 and 17 and sheet(s) 23. The panes 15 and 17 and sheet 23 may be bonded to the spacers 19 and 21 using an adhesive sealant (not shown), which could be a polyisobutylene (PIB) adhesive. A secondary sealant 25, e.g. of polyurethane or silicone, ensures that the interior of the IGU is sealed from moisture. Further, the spacers 19 and 21 may be filled with a desiccant material to remove any residual moisture between the panes to prevent fogging of the IGU.

Figure 3:
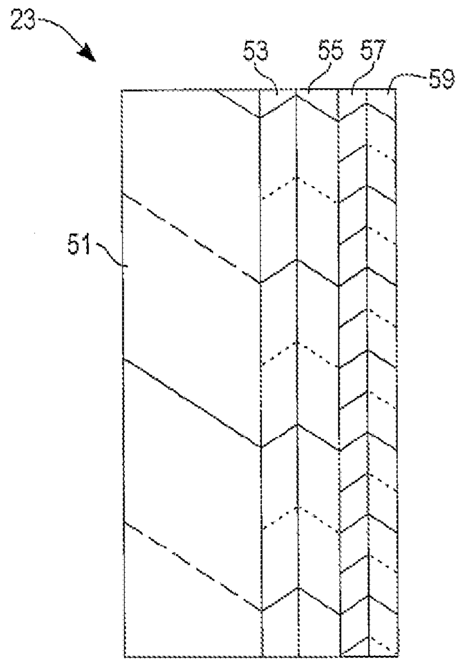
FIG. 3 is a side sectional view of a first coated film embodiment in accord with the present invention and usable in the IGU embodiments of FIGS. 1A and 1B.

With reference to FIG. 3, the sheet 23 (and likewise, at least one of the sheets 43 and 45 in FIG. 1B), is a visually transparent, infrared reflecting, composite film in which a series of layers 53-59 are coated onto a surface of a polymer substrate 51. In particular, the sheet 23 may be a polyethylene terephthalate (PET) film 51 coated with a stack of dielectric and metal layers 53-59. Varieties of PET film are available with heat shrink properties that allow the film to be tensioned (made taut) after assembly. This substrate is typically from 25 to over 125 micrometers thick.

The first layer 53 immediately adjacent to the polymer substrate 51 may be an amorphous dielectric, such as indium oxide ($In_2O_3$). It is typically about 20 to 80 nm thick.

The second layer 55 may be the seed layer, composed of a more crystalline dielectric than the indium oxide layer 53. In particular, a seed layer 55 in accord with present invention is a zinc-based oxide layer that is a most 15 nm, and typically 5 to 10 nm thick. The zinc-based oxide layer is typically selected from any of a variety of silver-seeding layers including ZnO, aluminum-doped zinc oxide (with up to about 2% Al) (commonly known as ZAO), gallium-doped zinc oxide (with up to about 2% Ga) (commonly known as ZGO), ZnO/$SnO_2$ (with the Sn content between 1% and 10% of the total zinc and tin content), and ZnO/$In_2O_3$ (with the In content being approximately 10% of the total zinc and indium content). The selected zinc-based oxide material may be sputtered from a ceramic or metallic target. The thinness of this ZnO layer 55 gives it the ability to withstand the strain of the tensioned sheet without cracking. A minimum thickness of 5 nm ensures that the outer surface of the ZnO layer 55 can serve as an adequate seed for high quality silver deposition.

The third coating layer 57 is the metallic infrared reflective low emissivity coating, which may be composed of silver or of a silver alloy that includes palladium, copper and/or gold. The thickness of the metallic layer 57 is typically 5 to 60 nm, giving it adequate visible light transmission.

A very thin (<5 nm) cap layer (not shown), such as nichrome (NiCr), Ti, ZAO or nichrome nitride ($NiCrN_x$), may be coated on top of the silver layer to preserve the silver quality during the deposition of the outer dielectric.

An outer dielectric layer 59 is formed on the metallic layer 57. This may be composed of indium oxide, and is typically 20 to 50 nm thick. The choice of indium oxide for dielectric layers 53 and 59 is motivated by its crack resistance due to its amorphous quality, while zinc oxide is used for the seed layer to ensure high quality silver deposition for low emissivity. But the zinc oxide seed layer is kept thin enough to minimize its susceptibility to cracking under stress.

Figure 4A:
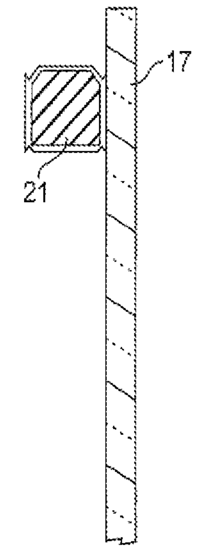
FIGS. 4A through 4D are side sectional views corresponding to FIG. 2 that illustrate the steps of assembling an IGU with suspended tensioned film.
Figure 4B:
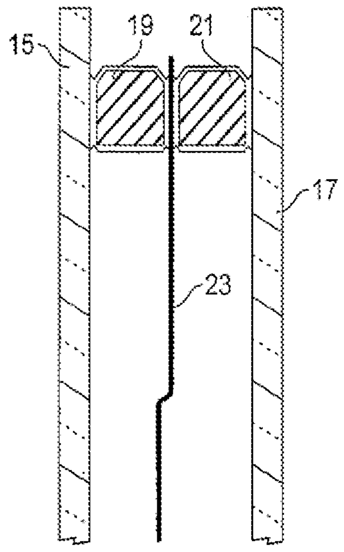
Figure 4C:
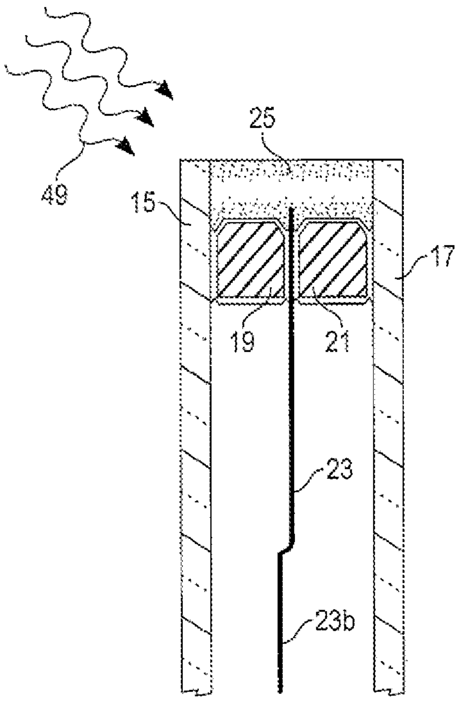
Figure 4D:
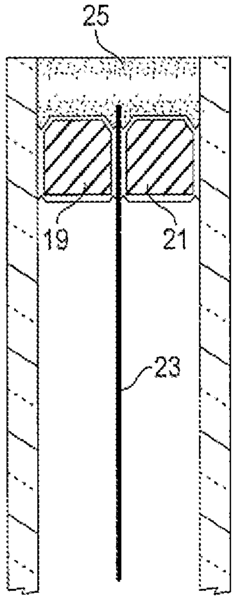

As seen in FIG. 4A, assembly of an IGU begins by bonding a window pane 17 to one of the spacers 21 using an adhesive sealant. Likewise, window pane 15 is bonded to the other spacer 19. The sheet 23 is bonded to both spacers 19 and 21, leaving the structure seen in FIG. 4B, but generally will not be sufficiently taut to remove all wrinkles 23*b*. In FIG. 4C, the assembled unit is subject to a heat treatment 49 that causes the PET substrate of sheet 23 to shrink. This removes any wrinkles 23*b*, leaving a generally planar sheet 23, suspended in a substantially parallel relation to the panes 15 and 17, as seen in FIG. 4D. Although heating the assembled unit to cause the plastic sheet to shrink so as to become taut and wrinkle-free is one way to tension the sheet 23, other tensioning techniques could be used. In any case, despite the strain, the coating materials, including the zinc oxide seed layer 55, are resistant to cracking.

Figure 5:
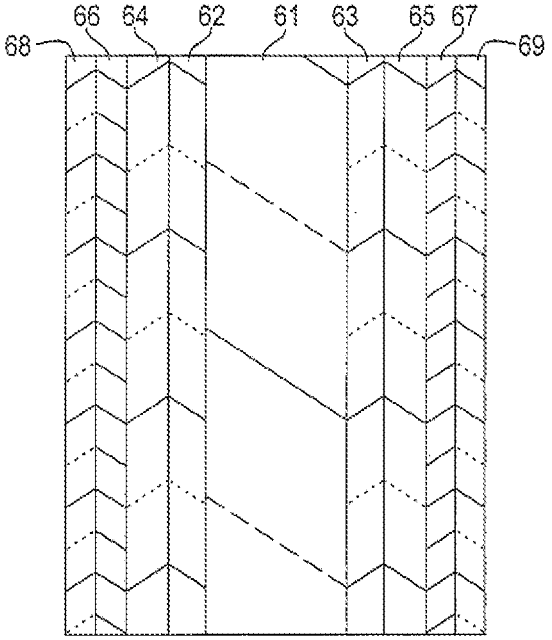
FIGS. 5 and 6 are side sectional views of second and third coated film embodiments in accord with the present invention.

With reference to FIG. 5, an alternative embodiment of the suspended sheet has the polymer substrate 61 coated on both of its surfaces. As in FIG. 3, the coating begins on both surfaces with generally amorphous dielectric coatings 62 and 63, e.g. of $In_2O_3$, typically 20 to 80 nm thick. Seed layers 64 and 65 are composed of thin ZnO of at most 15 nm thickness. Metallic IR reflecting layers 66 and 67, typically of silver or a silver alloy, also 5 to 60 nm thick, are deposited on the respective seed layers. The use of zinc oxide ensures high quality deposition of the silver, giving the sheet its markedly lower emissivity. Finally, another amorphous dielectric coating 68 and 69, e.g. of 20 to 60 nm $In_2O_3$, serves as protective outer coat on the silver.

Figure 6:
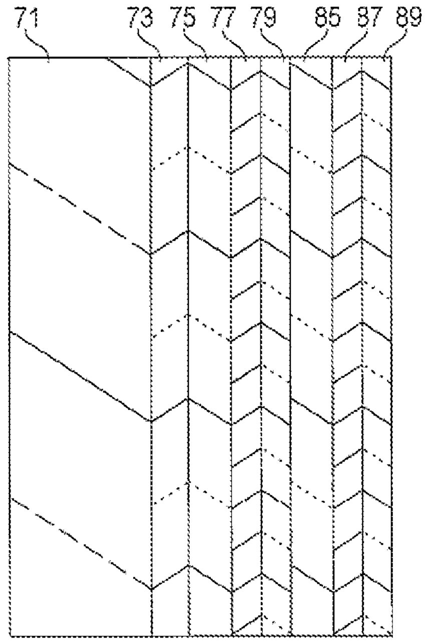

With reference to FIG. 6, yet another embodiment of the suspended film sheet has a thicker stack with multiple IR reflecting layers 77 and 87. Thus, a PET substrate 71 is coated with a first set of amorphous dielectric, crystalline seed dielectric, metallic IR reflecting, and amorphous dielectric layers 73-79, followed by yet another sequence of seed dielectric layer 85, metallic IR reflecting layer 87, and amorphous outer dielectric layer 89. This can be repeated any number of times, provided that the cumulative thickness of all of the metallic layers does not exceed 60 nm, in order that there be adequate visible transparency through the IGU. As before, the amorphous dielectric may be chosen to be $In_2O_3$, while the various seed layers are zinc oxide, each not exceeding 15 nm in thickness for adequate crack resistance.

EXAMPLES

Examples 1-6 and Comparative Examples C1-C6

A series of silver-based, low-emissivity films were prepared by coating a polyethylene terephthalate film having a thickness of 3 mil with a dielectric-silver-dielectric optical stack using standard sputtering techniques and a laboratory scale, moving web sputtering unit. Representative examples of sputtering methods and equipment can be found in U.S. Pat. Nos. 4,204,942 and 4,849,087. The sputtering apparatus was configured to sequentially deposit the dielectric and metal layers on the PET film using multiple, magnetron cathode zones as the PET film was advanced past the cathodes. The cathode zones were isolated from each other as mini-chambers thereby producing a local environment for the containment of the various plasma gases. This arrangement allows separate sputtering processes to be carried out simultaneously at each station with variations in atmosphere from station to station but with minimal cross-contamination between the cathode zones.

The metal oxide dielectric layers were deposited by direct reactive sputtering in the presence of a reactive gas mixture (oxygen, argon, nitrogen, and hydrogen). The metal layer, i.e., silver, was deposited on the dielectric layer by sputtering in the presence of an inert gas such as argon. An indium oxide dielectric layer was deposited on the silver layer. In some examples, a thin cap layer was deposited on top of the silver layer. The thickness of the various layers was controlled by standard means such as, for example, by varying the voltage and current fed to the electrode targets, the gas flow rates, and the speed at which the substrate is moved past the target.

Examples 1-6 were prepared by sputtering an indium oxide layer base layer directly on the PET film, followed by a zinc oxide seed layer of varying thicknesses, a 10 nm thick silver layer, and a 42 nm thick top layer of indium oxide. The combined thickness of the bottom indium oxide and zinc oxide layers was maintained at 42 nm in all of the Examples; thus, the thickness of the bottom indium oxide layer was reduced as the thickness of the zinc oxide seed layer was increased. Comparative Examples C1-C6 were prepared in an identical manner as Examples 1-6 except that no zinc oxide seed layer was added in Comparative Examples C4-C6. Examples 4-6 and Comparative Example C4 contained an additional <5 nm thick titanium cap layer deposited on top of the silver layer. Table 1 shows the thickness of the zinc oxide seed layer in nm for each of the Examples and Comparative Examples.

The films were tested for their ability to resist cracking when elongated using a Mandrel Bend Test as set forth in ASTM Method D522. This test method determines the cracking resistance (i.e., flexibility) of coatings deposited on sheet metal and other flexible substrates.

In the mandrel bend test, a 7 cm×10 cm coated sheet or film is bent over conical or cylindrical mandrels of various diameters and the presence of any cracks, color changes, adhesion failures, etc. of the optical coating is noted. Coatings attached to substrates are elongated when the substrates are bent during the manufacture of articles or when the articles are abused in service. As the mandrel diameter is reduced, the degree of elongation and stress applied to the film and coating is increased. Thus, the appearance or not of cracks as the films are bent by decreasing mandrel sizes reflects the degree of elasticity of the coating and its resistance to cracking under increasing levels of tension.

The results of the mandrel bend test for the above examples are shown in Table 1. As indicated by the data of Table 1, none of Examples 1-6 showed any cracking with mandrel diameters of 6 or above. These results are similar to the results from Comparative Examples C4-C6, which contained no seed layer. Comparative Examples C4-C6 each showed no cracking with a 6 mm mandrel but did exhibit cracking with a 5 mm mandrel. Examples 2 and 3 showed no cracking with a 5 mm mandrel and thus exhibited a higher resistance to cracking than the other samples. By contrast, Comparative Examples C1-C3, which have ZnO seed layers of 20-30 nm, showed cracking with the less demanding 6 mm mandrels.

TABLE 1

Results of Mandrel Bend Test (ASTM D522)

| | | | Mandrel Diameter (mm) X = cracks; blank = no cracks | | | | | | |
|---|---|---|---|---|---|---|---|---|---|
| Ex. | ZnO Layer (nm) | Cap Layer | 2 | 3 | 4 | 5 | 6 | 8 | 10 |
| 1 | 15 | No | X | X | X | X | | | |
| 2 | 10 | No | X | X | X | | | | |
| 3 | 5 | No | X | X | X | | | | |
| 4 | 10 | <5 nm | X | X | X | X | | | |
| 5 | 14 | <5 nm | X | X | X | X | | | |
| 6 | 6 | <5 nm | X | X | X | X | | | |
| C1 | 30 | No | X | X | X | X | X | | |
| C2 | 25 | No | X | X | X | X | X | | |
| C3 | 20 | No | X | X | X | X | X | | |
| C4 | 0 | <5 nm | X | X | X | X | | | |
| C5 | 0 | No | X | X | X | X | | | |
| C6 | 0 | No | X | X | X | X | | | |

What is claimed is:

1. An infrared-reflecting composite film, comprising:

a heat-shrunk, tensioned polymer sheet having a substantially transparent coating deposited on at least one surface, the transparent coating comprising a composite multilayer stack of dielectric and metallic layers, the stack comprising an amorphous indium oxide dielectric layer about 20 to about 80 nm thick in contact with the polymer sheet, a crystalline zinc-based oxide seed layer about 5 to about 15 nm thick deposited on the amorphous indium oxide dielectric layer, at least one low-emissivity silver or silver alloy layer deposited upon the zinc-based oxide seed layer, and an amorphous dielectric outer layer.

2. The composite film as in claim 1, wherein the polymer sheet comprises polyethylene terephthalate and has a thickness of about 25 to about 125 micrometers.

3. The composite film as in claim 1, wherein the zinc-based oxide seed layer has a thickness of about 5 to about 10 nm and comprises zinc oxide, aluminum-doped zinc oxide, gallium-doped zinc oxide, mixtures of zinc oxide and tin oxide, mixtures of zinc oxide and indium oxide, or combinations thereof.

4. The composite film as in claim 3, wherein the zinc-based oxide seed layer comprises zinc oxide.

5. The composite film as in claim 1, wherein the multilayer stack further comprises a cap layer comprising nichrome, titanium, zinc aluminum alloy, or nichrome nitride coated on top of the silver or silver alloy layer, wherein the cap layer has a thickness of 5 nm or less.

6. The composite film as in claim 1, wherein the silver or silver alloy layer has a thickness of about 5 to about 60 nm.

7. The composite film as in claim 1, wherein the silver alloy layer comprises palladium, copper, gold, or a combination thereof.

8. The composite film as in claim 1, wherein the amorphous dielectric outer layer comprises indium oxide and has a thickness of about 20 to about 60 nm.

9. The composite film as in claim 8, wherein the multilayer stack further comprises one or more sequences of zinc-based oxide seed layer, silver layer, and indium oxide layer, each zinc oxide seed layer having a thickness of about 5 to about 15 nm, and the total thickness of all silver layers is 60 nm or less.

10. The composite film as in claim 8, wherein the amorphous dielectric outer layer is deposited on the silver or silver alloy layer.

11. The composite film as in claim 1, wherein the multilayer stack is coated upon both surfaces of the polymer sheet.

12. An insulating glass unit comprising the composite film of claim 1.

13. An infrared-reflecting composite film, comprising:

a transparent, heat-shrunk, tensioned polyester sheet having a thickness of about 25 to about 125 micrometers and a substantially transparent coating deposited on at least one surface, the transparent coating comprising a composite multilayer stack of dielectric and metallic layers, the stack comprising an amorphous indium oxide dielectric layer about 20 to about 80 nm thick in contact with the polymer sheet, a crystalline zinc-based oxide seed layer about 5 to about 10 nm thick deposited on the amorphous indium oxide dielectric layer, at least one low-emissivity silver layer having a thickness of about 5 to about 60 nm deposited upon the zinc-based oxide seed layer, and an indium oxide outer layer having a thickness of about 20 to about 60 nm.

14. The composite film as in claim 13, wherein the multilayer stack is coated upon both surfaces of the polyester sheet.

15. An insulating glass unit comprising the composite film of claim 13.

* * * * *